United States Patent [19]
McKay

[11] 3,873,755
[45] Mar. 25, 1975

[54] METHOD FOR PRECOOKING BACON
[75] Inventor: William C. McKay, Grosse Pointe, Mich.
[73] Assignee: Haberstroh Farm Products, Inc., Mt. Clemens, Mich.
[22] Filed: Apr. 19, 1974
[21] Appl. No.: 462,405

Related U.S. Application Data
[63] Continuation of Ser. No. 216,421, Jan. 10, 1972, abandoned.

[52] U.S. Cl. ................................................ 426/523
[51] Int. Cl. ............................................ A22c 18/00
[58] Field of Search ...... 426/523, 113, 315; 99/349, 99/391, 443 C

[56] References Cited
UNITED STATES PATENTS
| | | |
|---|---|---|
| 1,732,289 | 10/1929 | Thomas .............................. 426/523 |
| 3,169,871 | 2/1965 | Macchi et al. ...................... 426/523 |
| 2,528,832 | 11/1950 | Johnson ............................. 426/315 |
| 2,807,550 | 9/1957 | Zarotschehzeff et al. .......... 246/113 |
| 3,428,783 | 2/1969 | Niles .............................. 426/523 X |
| 3,528,361 | 9/1970 | Levan .................................. 99/349 |

Primary Examiner—Hyman Lord
Attorney, Agent, or Firm—Barnes, Kisselle, Raisch & Choate

[57] ABSTRACT

A method of precooking bacon efficiently and uniformly wherein the bacon is arranged between upper and lower flights of a conveyor moving horizontally through an oven and streams of heated gaseous medium are directed against the conveyor from above and below to effect a rapid transfer of heat to the bacon and to clear the bacon and the conveyor of the fat rendered from the bacon.

8 Claims, 4 Drawing Figures

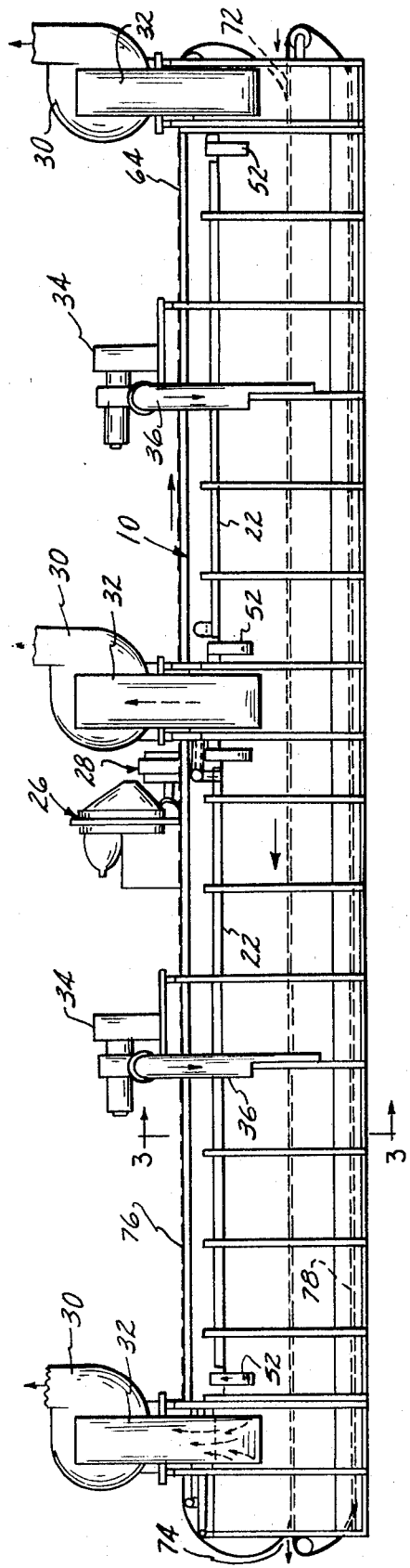
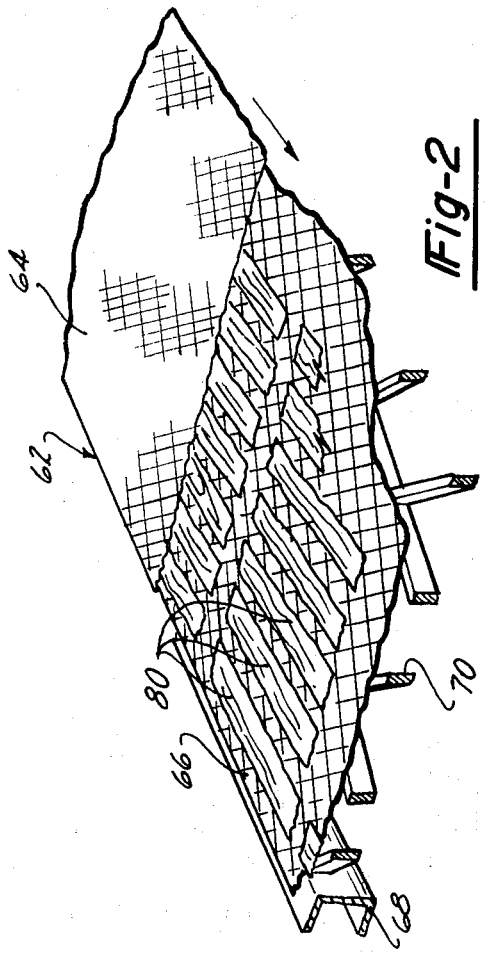

3,873,755

METHOD FOR PRECOOKING BACON

This is a continuation of application Ser. No. 216,421, filed Jan. 10, 1972, now abandoned.

This invention relates to a method of precooking bacon.

The precooking of sliced bacon on a production basis has been practiced to a limited extent for several years, but the practical problems encountered have been numerous. As a result, commercially precooked bacon has not heretofore received wide acceptance although the demand for precooked bacon has substantially increased.

A commercially practical method for precooking bacon slices of necessity demands the economical production of a uniformly fully cooked product. It is important that the product be fully precooked so that when it is eventually prepared for consumption it is only necessary to heat it to the desired serving temperature, in a minimum of time, without further cooking. Fully cooked bacon has a somewhat cripsy texture and a brownish color. To achieve this texture and appearance it is necessary that the raw bacon be cooked to an extent that it is rendered down about 75 percent; that is, the fully cooked product weighs only about 25 percent of its original raw weight. Unless the bacon is rendered to this extent in the precooking process the product is chewy instead of crisp and has a fatty taste which requires further cooking to become palatable to most persons.

Attempts have been made to precook bacon by conveying it horizontally below radiant heating elements. Heating from one side in this manner results in an unevenly cooked product. In order to cook bacon fully and uniformly in a commercially practical manner it is essential that the bacon slices be heated simultaneously from both sides thereof. However, radiant heaters should not be located directly below the bacon because of the fire hazard resulting from grease dripping on the heating elements. To overcome this problem it has been proposed to support the bacon between two runs of a conveyor which is directed through the oven in a plane inclined to the horizontal so that the heating elements can be located in a position laterally offset from the bacon rather than directly below the grease dripping from the bacon. However experience has shown that in broiling bacon in this manner numerous other problems are encountered among which is the fact that the strips adjacent the lower portion of the inclined conveyor are cooked to a lesser extent than the bacon strips adjacent the upper portion of the conveyor because the fat rendered flows down the inclined conveyor and tends to insulate the lower bacon strips.

It has also been proposed to locate the heating elements only above the bacon conveyor and cook both sides of the bacon strips by directing the horizontally traveling conveyor around a roll which inverts the conveyor and the bacon retained therein. This type of arrangement not only requires a relatively large oven, but also results in tearing and shredding of the bacon strips as a result of the relative movement which occurs between the two conveyor belts between which the bacon is retained when the two belts are directed around the conveyor inverting roll.

Another method of precooking bacon involves the use of microwave heating elements. While such elements result in rapid heating, they do not produce the appearance and texture desired of cooked bacon. Microwave heating in essence involves heating the product internally rather than externally. When bacon is cooked in this manner, for the most part it is not completely rendered and does not possess the crisp brown appearance normally desired by most people.

Deep fat frying of bacon is likewise not a real solution because of the inability to obtain uniform cooking and because of the necessity of filtering the cooking fat and keeping it fresh to avoid rancidity.

It is an object of this invention to provide a method of precooking bacon in an economical manner which avoids the above discussed problems. More specifically the bacon cooking method of this invention enables bacon to be fully and uniformly cooked in a relatively short time in an oven of moderate size. Furthermore, bacon cooked in accordance with the present invention has the desired flavor, appearance and texture.

In accordance with this invention bacon slices are cooked in an oven while retained between upper and lower flights of a conveyor directed horizontally through the cooking zone of the oven. The heating source for the oven comprises a fuel burner located remotely from the bacon-cooking zone. The temperature generated at the burner is utilized to heat a gaseous medium which is in turn conveyed to the bacon-cooking zone at a relatively high velocity. Furthermore, the heated gaseous medium is directed with an extremely high degree of turbulence against the bacon from above and below. The high velocity and turbulence of the gaseous medium effect an extremely rapid rate of heat transfer to the bacon and simultaneously rid the bacon and conveyor belts of the rendered fat which would otherwise tend to act as an insulator and produce an unattractive appearance when packaged. The temperature of the bacon conveyor is maintained below the flash point of bacon grease.

Other objects and features of the present invention will become apparent from the accompanying drawings and description, in which:

FIG. 1 is a side elevational view of a bacon cooking oven for practicing the method of the present invention;

FIG. 2 is a fragmentary perspective view of the bacon conveyor within the oven;

Figure 3:
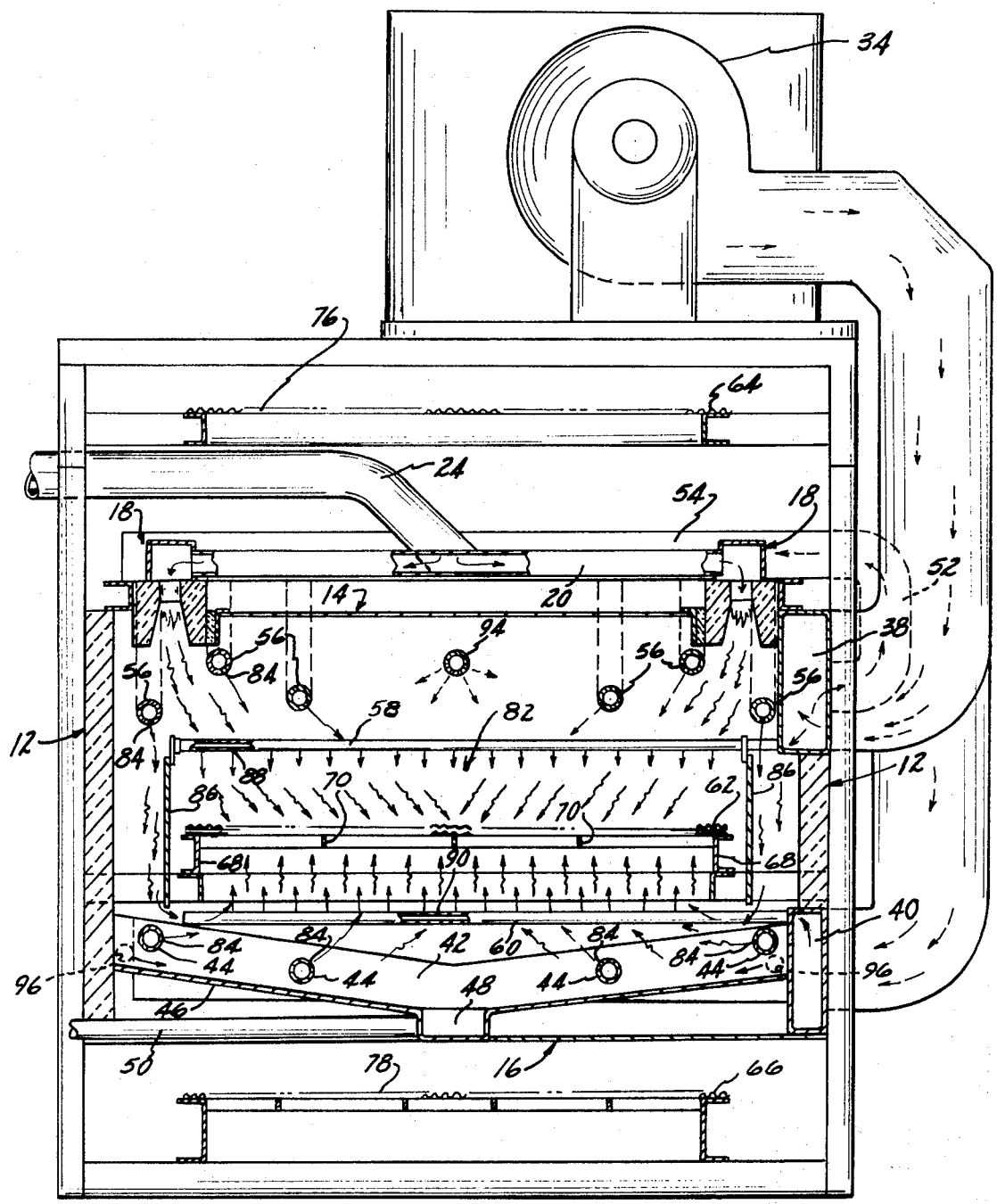
FIG. 3 is a sectional view of the oven taken generally at line 3—3 in FIG. 1.

Referring to FIGS. 1 and 3, one type of oven in which the process of the present invention may be practiced is designated 10 and generally comprises an elongate horizontally extending chamber open at opposite ends. The oven includes suitable insulated opposite side walls 12, a top wall 14 and a bottom wall 16. Along the opposite side edges of top wall 14 there is arranged within the oven a row of gas burners 18. A combustible mixture of pressurized air and natural gas is supplied to burners 18 from distribution conduits 20 which are connected to main supply lines 22 by branch conduits 24. Supply lines 22 are connected to the outlet of a suitable arrangement of an air blower 26 and a filter and mixing valve 28. Burners 18 are of a type capable of producing a high volume of combustion gases discharged from the burners at relatively high velocities.

The oven illustrated in FIG. 1 is divided lengthwise generally into two zones. Adjacent the opposite ends of each zone there is arranged an exhaust fan 30, the inlet of which is connected to a duct 32 which in turn is connected to the interior of the oven adjacent the upper end of one of the side walls. The outlets of fans 30 extend to the exterior of the building in which the oven is located. There is also arranged exteriorly of oven 10 a pair of blowers 34, one for each zone of the oven, for directing pressurized air into the oven. The outlets of blowers 34 discharge into ducts 36 extending downwardly along one side of the oven. Ducts 36 connect with longitudinally extending upper and lower air plenum chambers 38 and 40, respectively, located along one side of the oven. At regularly spaced intervals adjacent the bottom wall 16 of the oven transversely extending air ducts 42 connect into lower plenum chamber 40. Air ducts 42 supply pressurized air to a series of directional air pipes 44 which are spaced slightly above a grease collection tray 46 extending lengthwise along the bottom of the oven. Tray 46 has inwardly and downwardly bottom sloping walls which discharge into a center channel 48 from which the grease can be discharged to a central collection point by means of drain pipes 50. The upper plemun chamber 38 has a series of U-shaped elbows 52 connected therewith and extending to transversely extending distribution ducts 54 located above the top wall 14 of the oven. Distribution ducts 54 supply pressurized air to an upper series of directional air pipes 56.

Figure 4:
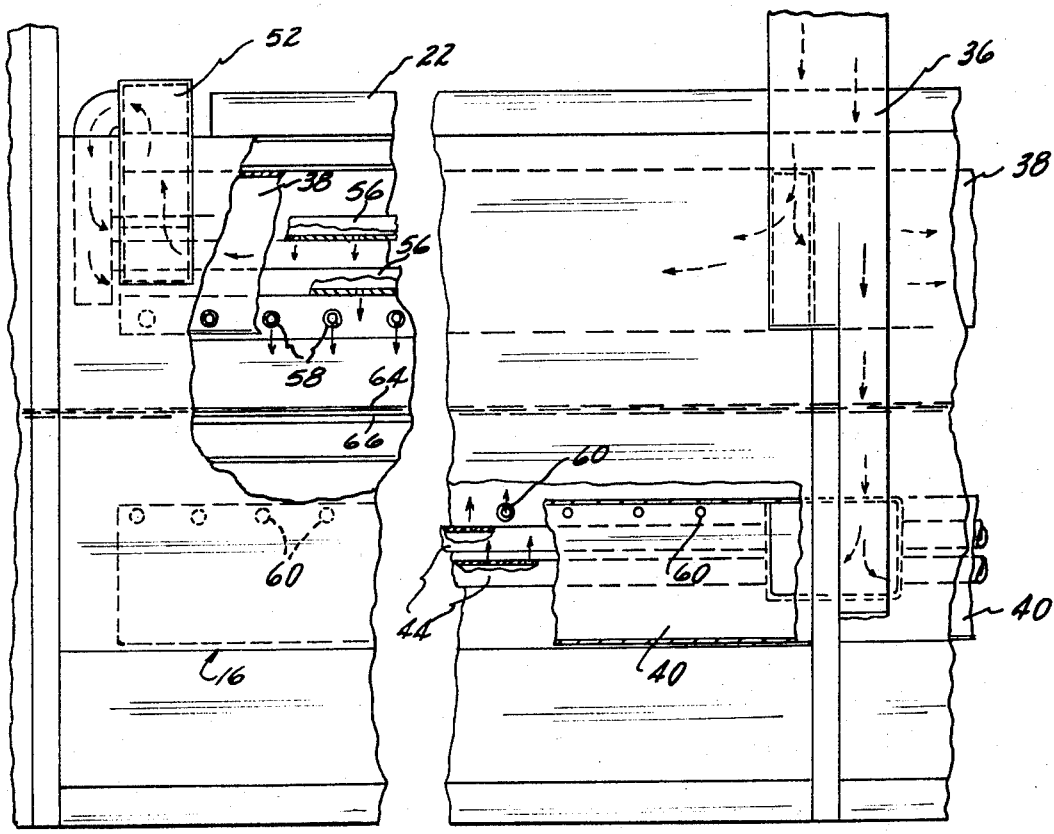
FIG. 4 is a fragmentary side elevational view of the oven, partly in section.

There is also arranged within the oven a series of longitudinally spaced, transversely extending upper secondary air pipes 58 each connected to the upper plenum chamber 38 and a series of lower secondary air pipes 60 each connected with the lower plenum chamber 40. As shown in FIG. 4, the upper air pipes 58 are staggered longitudinally relative to the lower air pipes 60.

Within the oven there is arranged a power driven conveyor generally designated 62 in FIG. 2. Conveyor 62 comprises an upper and a lower conveyor belt 64 and 66, respectively. Each conveyor belt is preferably formed of a woven mesh material, such as stainless steel. The support for conveyor 62 within the oven comprises a pair of transversely spaced channels 68 with a herringbone structural network 70 transversely spanning the channels. Conveyor support 68,70 is located horizontally within the oven so that conveyor 62 is located generally vertically centrally between the upper and lower air pipes 58,60, respectively. Conveyor 62 is motor driven so that it travels within the oven from the inlet end 72 to the outlet end 74 in the direction of the arrow shown in FIG. 1. By means of suitable guide rollers the upper belt 64 is directed upwardly at the outlet end 74 of the oven so that it travels a return path back to the inlet end 72 of the oven over a suitable conveyor return track 76. Likewise, the lower conveyor belt 66 is directed downwardly at the outlet end 74 of the oven so that it travels a return path 78 below the bottom wall 16 of the oven back to the inlet end 72. However the two conveyor belts are synchronized in speed so that there is no relative movement between them as they travel horizontally through the oven.

At the inlet end of the oven suitable apparatus is employed for depositing strips 80 of raw bacon on the lower conveyor belt 66. The bacon strips are preferably arranged in rows as shown in FIG. 2. As the lower belt 66, loaded with bacon strips 80, enters the oven the top belt 64 is directed thereover so that it rests directly on the lower belt and its weight maintains the bacon strips 80 in a generally flattened condition as they travel through the oven. It is apparent from FIG. 2 that the open mesh conveyor belts 64,66 are substantially unobstructed to the passage of air from above and below the conveyor.

The upper directional air pipes 56 which extend lengthwise within the oven are so located as to propel the high volume of combustion gases generated by burners 18 toward the cooking zone 82 of the oven. Zone 82 may be considered as the vertical space between the air pipes 58,60. Thus, each of the pipes 56 are provided with a row of orifices or jets 84 which serve to aspirate the combustion gases from burners 18 and propel them in the desired direction. The orifices 84 in the outermost pipes 56 extend generally vertically downwardly so as to propel the exhaust gases from the burners downwardly between the side walls 16 of the oven and the vertical baffles 86 at the opposite ends of the air pipes 58,60. The orifices 84 of the remaining pipes 56 are oriented to propel the combustion gases in a downwardly direction generally toward the center of the cooking zone 82. Likewise, the lower pipes 44 are provided with similar orifices or jets 84 for directing the downwardly propelled combustion gases upwardly and generally toward the center of the cooking zone 82. The upper set of transversely extending secondary air pipes 58 have downwardly directed jets or orifices 88 and the lower set of transversely extending air pipes 60 have upwardly directed orifices or jets 90. Thus the air streams from pipes 58 are directed downwardly toward the top of conveyor 62 and the air issuing from the lower set of air pipes 60 is directed upwardly against the bottom side of conveyor 62. Orifices 88 on pipes 58 are staggered transversely relative to orifices 90 on pipes 60. Thus the air streams from the two sets of pipes 58,60 are offset from each other both longitudinally and transversely of the conveyor.

Depending upon the quantity and pressure of the fuel supplied to burners 18 the temperature of the combustion gases issuing from burner 18 may be as high as 3,000°F. This temperature can be controlled as desired. The temperature for cooking the bacon (that is, the temperature in the heating zone 82 directly at conveyor 62) is preferably between about 325°F. and 410°F., depending upon the slice thickness and air velocity, and should not be in excess of the flash point of bacon fat; that is, about 435°F. In the arrangement illustrated, although the temperature generated at the burners 18 is substantially higher than 435°F., the combustion gases are diluted substantially by the high pressure, high velocity room temperature air streams discharging from pipes 44,56,58,60. In order to obtain high velocity air streams issuing from these air pipes it is essential that blowers 34 and exhaust fans 30 are capable of producing a high volume air flow at moderate pressures. In an oven about 66 feet long, having a heating chamber about 7½ feet wide and 4 feet high and with the secondary air pipes spaced 6 inches apart, the desired temperature and air velocities were obtained in cooking zone 82 with two blowers 34 operating to produce an air flow of 68,000 cubic feet per minute at a pressure of about 24 inches of water column. The three exhaust fans operated to maintain the same total air flow. The pressure in the oven is therefore substantially atmospheric so that there is little tendency to either draw room air into the oven or leak oven atmosphere into the surrounding room. The number and sizes of the orifices in pipes 44,56,58,60 were determined to obtain an air velocity of about 16,000 to 17,000 feet per minute at the jets. Air pipes 58 and 60 were located about 9 inches above and below conveyor 62. The air velocity at the conveyor was about 600 feet per minute and the temperature at the conveyor averaged about 400°F. The temperature along the bottom of the oven chamber above grease tray 46 was about 390°F. and the temperature adjacent pipes 58 was about 450°F. Even though at some locations in the oven above and beyond the sides of the cooking zone the temperature was above the flash point of grease (about 435°F.), the velocity of the air was so great as to be incapable of supporting combustion. For example, the oven atmosphere was completely exhausted up to 45 times per minute. When the oven was operated in the above described manner the bacon slices having a thickness of twelve slices to an inch were fully cooked; that is, rendered down about 75 percent, in about 4 to 4½ minutes.

The upper and lower air pipes 58,60 are disposed sufficiently close to one another and the orifices thereon are arranged so that ambient air issuing from the orifices 88,90 aspirates the mixture of hot air and gases from below and above these pipes towards the conveyor to produce a highly turbulent atmosphere of high velocity air streams which are directed against the upper and lower sides of the conveyor. This turbulent mass of high velocity air effects a rapid transfer of heat from the air to the bacon and, since this air is continually exhausted to the outside atmosphere (outside of the building in which the oven is located), the atmosphere in the oven is a continually changing one.

In practicing the method disclosed herein excellent results have been obtained when the temperature at the conveyor is about 400°F. and the velocity of the air impinging against the bacon strips when the strips are aligned with pipes 58 or 60 is between about 400 and 800 feet per minute. If the air velocity is below about 400 feet per minute, then the rate of heat transfer between the air and the bacon is reduced to an extent as to require a relatively long time to cook the bacon. On the other hand it appears, if the air velocity adjacent the belt is in excess of about 800 feet per minute, at 400°F. the edges of the bacon strips begin to overcook and burn and the bacon is unsightly and not cooked uniformly. When the cooking temperature is reduced to about 320°F. the air velocity can be increased very substantially, for example, to 2,000–7,500 feet per minute to obtain uniform cooking in even less time. The relatively high velocity air streams adjacent the conveyor not only promote a rapid transfer of heat but also serve a valuable secondary purpose; namely, the turbulence resulting therefrom clears or wipes the bacon strips and the conveyor of the rendered fat as soon as it forms so that it does not tend to remain thereon and provide an insulating effect which would seriously impede a rapid heat transfer. Thus, in the method disclosed herein the bacon is heated primarily by conduction from the air and from the heated conveyor belts and, to a slight extent, by the radiant heat from the metal conveyor belts themselves. The heated air also dries the bacon so that it attains a crisp condition in a very short time.

Aside from the fact that the bacon cooking method disclosed herein enables bacon strips to be fully and uniformly cooked in a relatively short time, it possesses several other distinct advantages. By locating the burners 18 in a zone remote from the cooking zone the temperature generated by the heat source can be relatively high since the gaseous atmosphere in the cooking zone 82 does not exceed the flash point of the grease which is normally about 435°F. Thus, by utilizing a remotely located heat source and by employing large volumes of air at high velocities, the present method eliminates substantially completely any fire hazard resulting from the flow or dripping of melted fat. The fat rendered from the bacon simply drips downwardly on tray 46 and is discharged to a central collection point. Since the fat is rendered at a temperature below its flash point it has a light clear color and is suitable for use for processing other foods without costly refinement procedures. Furthermore, by heating the bacon strips uniformly and for a relatively short period of time between the conveyor belts it has been found that the strips tend to remain in a flattened condition and shrink a relatively small amount even though they are rendered about 75 percent. For example, when bacon is cooked in accordance with the present process raw strips of approximately 9½ inches in length are only reduced to 7 inches or 8 inches when fully cooked. If the temperature at the belt were substantially higher than 400°F., not only would a fire hazard be created, but the shrinkage of the bacon strips would also be substantially increased. In addition, since the mixture of gases and air within the oven are continually exhausted to the outside atmosphere, the odors produced within the building itself resulting from cooking the bacon are reduced to a minimum.

The above described process may also be utilized for cooking diced bacon; that is, small bacon pieces in a size range of about ⅛ inch to ½ inch. When cooking diced bacon the two conveyor flights are spaced apart vertically (say about ¾ inch to ½ inch) and the space therebetween suitably closed along the opposite side edges. The raw bacon bits are applied to the lower belt as a layer of about ½ inch thick. In view of the substantially greater surface-to-mass ratio of diced bacon as compared with bacon slices, the fact that the bits can vary from 100 percent fat to 100 percent lean and the desirability of obtaining a very crunchy product rendered down about 85 percent to 90 percent, the diced bacon is cooked at a lower temperature for a somewhat longer time. For example, the burners and conveyor can be adjusted to cook the diced bacon for ten minutes at about 300°F. The high velocity heated air streams produce a desired turbulence of the layer of diced bacon bits which results in a relatively uniform cooking of the bacon bits with very high degree of fat and moisture removal.

The present invention considered in conjunction with the specific apparatus shown possesses other desirable advantages. For example, when it is desired to clean the oven, it is merely necessary to operate the conveyor without bacon thereon and increase the firing at burners 18 so that the temperature in the cooking zone 82 is elevated to about 900°F. At this temperature any protein sugar and grease rendered from the bacon and clinging to the conveyor, the oven walls, the baffles, the pipes and other structural parts of the oven are converted into ash. A water spray pipe 94 located above and centrally of the heating zone and extending lengthwise of the oven can be utilized to wash the remaining ash and residue from the conveyor, pipes, etc. into the tray 46. Additional flush pipes 96 are provided along the opposite side edges of tray 46 for flushing this residue down to the central channel 48 and to a point of discharge. It will be appreciated that the specific apparatus shown and described is merely illustrative of one form of oven which may be utilized for practicing this invention. This method of cooking bacon can be practiced in ovens of radically different designs.

I claim:

1. The method of precooking bacon strips such that upon subsequent serving the bacon need only be heated to the desired serving temperature without further cooking which comprises, arranging bacon strips in a flat horizontal plane between the upper and lower flights of a foraminous conveyor, maintaining the bacon strips substantially flat by permitting the weight of the upper conveyor flight to bear down on the bacon strips, advancing the bacon strips by means of said conveyor through a horizontally extending cooking zone located generally centrally between the upper and lower ends of an elongated oven while maintaining the strips in said flat horizontal plane, burning fuel at a heat source located adjacent the upper end of the oven remote from the bacon in said cooking zone to produce hot gaseous products of combustion, the temperature of said gaseous products of combustion at said heat source being greatly in excess of the temperature adjacent the bacon while it is being cooked in said cooking zone, directing said gaseous products of combustion downwardly in said oven from said heat source, further directing said downwardly flowing gaseous product of combustion to zones vertically above and below the conveyor by means of a plurality of high velocity air jets within said oven directed toward said cooking zone from above and below the same with at least some of said air jets being oriented so that the combustion gases are directed generally toward the center of the cooking zone to promote lateral flow of a mixture of air and said gaseous combustion products uniformly and entirely across the lateral extent of the conveyor, then causing said air-gas mixture to be directed against the bacon on the conveyor by entraining the same into high velocity air streams produced by a second plurality of air jets which are uniformly spaced above and below the conveyor and which are oriented to direct air streams perpendicularly against the conveyor, the temperature of said heat source and the volume of air issuing from said two sets of air jets being controlled such that the temperature of the air-gas misture directly adjacent the conveyor is about 400°F. and the velocity of said air-gas mixture directly adjacent the conveyor is about 400 to 800 feet per minute, said bacon slices being about 1/12 inch thick and the speed of the conveyor being controlled so that the bacon remains in said cooking zone for about 4 to 4½ minutes and is rendered about 75 percent.

2. The method called for in claim 1 wherein the temperature of the air-gas mixture below the conveyor in the zone through which the rendered bacon fat drips from the bacon being cooked is below the flash point of the bacon fat.

3. The method called for in claim 1 wherein the velocity of the air-gas mixture adjacent the horizontal plane of the bacon in the cooking zone is maintained at about 600 feet per minute.

4. The method of precooking bacon strips such that upon subsequent serving the bacon need only be heated to the desired serving temperature without further cooking which comprises, arranging bacon strips in a flat horizontal plane between the upper and lower flights of a foraminous conveyor, maintaining the bacon strips substantially flat by permitting the weight of the upper conveyor flight to bear down on the bacon strips, advancing the bacon strips by means of said conveyor through a horizontally extending cooking zone located between the upper and lower ends of an elongated oven while maintaining the strips in said flat horizontal plane, burning fuel at a heat source located remote from the bacon in the cooking zone to produce hot gaseous products of combustion, the temperature of said gaseous products of combustion at said heat source being greatly in excess of the temperature adjacent the bacon while it is being cooked in said cooking zone, directing said gaseous products of combustion from said heat source by means of a plurality of high velocity jets within said oven directed toward the cooking zone with at least some of the air jets being oriented so that the combustion gases are directed generally toward the center of the cooking zone to promote lateral flow of a mixture of air and said gaseous combustion products uniformly and entirely across the lateral extent of the conveyor, then causing said air-gas mixture to be directed against the bacon on the conveyor by entraining the same into high velocity air streams produced by a second plurality of air jets which are uniformly spaced from the conveyor and which are oriented to direct air streams perpendicularly against the conveyor, the temperature of said heat source and the volume of air issuing from said two sets of air jets being controlled such that the temperature of the air-gas mixture directly adjacent the conveyor is between about 325° and 410°F. and the velocity of said air-gas mixture directly adjacent the conveyor is about 400 to 7,500 feet per minute, the thickness of the bacon slices and the speed of the conveyor being controlled so that the bacon is rendered about 75 percent.

5. The method called for in claim 4 wherein said air-gas mixture is exhausted from the oven at a rate to maintain the oven at substantially atmospheric pressure.

6. The method called for in claim 5 wherein the air-gas mixture is exhausted from the oven to an atmosphere other than the atmosphere in which the oven is located to minimize the presence of bacon cooking odors in the atmosphere immediately surrounding the oven.

7. The method called for in claim 6 wherein the air in said air streams is introduced into said oven in a substantially drier condition relative to the moisture content of the air-gas mixture exhausted from the oven.

8. The method called for in claim 4 wherein the temperature of the air-gas mixture directly adjacent the conveyor is about 400°F. and the velocity of the air-gas mixture directly adjacent the conveyor is between 400 and 800 feet per minute.

* * * * *